US006328256B1

(12) United States Patent
Ryan et al.

(10) Patent No.: US 6,328,256 B1
(45) Date of Patent: Dec. 11, 2001

(54) LOW-HEIGHT TUNABLE TILT ROTOR DOWNSTOP

(75) Inventors: Michael J. Ryan, Arlington; Brett R. Zimmerman, Hurst, both of TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/408,337

(22) Filed: Sep. 29, 1999

(51) Int. Cl.[7] .................................................. B64C 27/22
(52) U.S. Cl. ...................... 244/7 R; 244/17.11; 403/150; 403/151
(58) Field of Search ................... 244/17.11, 13, 244/12.4; 403/150, 151, 152, 161

(56) References Cited

U.S. PATENT DOCUMENTS

| | | | |
|---|---|---|---|
| 5,054,716 | * 10/1991 | Wilson | 244/56 |
| 5,352,090 | * 10/1994 | Churchill et al. | 416/61 |
| 5,642,982 | 7/1997 | Matuska et al. | 416/87 |
| 5,823,470 | * 10/1998 | Craig et al. | 244/7 R |
| 6,161,800 | * 12/2000 | Liu et al. | 244/7 R |

* cited by examiner

Primary Examiner—Peter M. Poon
Assistant Examiner—Kevin Jakel
(74) Attorney, Agent, or Firm—James E. Walton; Hill & Hunn LLP

(57) ABSTRACT

A improved tilt rotor aircraft comprising an airframe, at least one wing member coupled to the airframe, and at least one tilt rotor assembly carried by the at least one wing member. The improved tilt rotor aircraft includes a low-height tunable downstop assembly for isolating static and dynamic lateral loads between the tilt rotor assemblies and the wings. The low-height tunable downstop assembly comprises a pivotable striker assembly having an adjustable stiffness, and a cradle assembly adapted to releasably receive the striker assembly. The low-height tunable downstop assembly isolates yaw loads while providing a stiff vertical support.

32 Claims, 9 Drawing Sheets

LOW-HEIGHT TUNABLE TILT ROTOR DOWNSTOP

BACKGROUND ART

1. Field of the Invention

The present invention relates generally to conversion assemblies for use on tilt rotor aircraft for converting from a helicopter mode to an airplane mode, and vice versa. In particular, the present invention relates to a method and apparatus for stabilizing the articulating rotor portion relative to the stationary structure of the aircraft while in the airplane mode.

2. Description of Related Art

Tilt rotor aircraft are hybrids between traditional helicopters and traditional propeller driven aircraft. Typical tilt rotor aircraft have rotor systems that are capable of articulating relative to the aircraft fuselage. This articulating portion is referred to as a nacelle. Tilt rotor aircraft are capable of converting from a helicopter mode, in which the aircraft can take-off, hover, and land like a helicopter; to an airplane mode, in which the aircraft can fly forward like a fixed-wing airplane.

The design of tilt rotor aircraft poses unique problems not associated with either helicopters or propeller driven aircraft. In particular, certain static and dynamic loads are generated by the tilt rotor assemblies that are not present in either conventional helicopters or fixed wing aircraft. While in the aircraft mode, aircraft stability is maintained by a support assembly referred to as a "downstop" assembly. The downstop assembly has two main purposes. First, the downstop assembly must provide vertical stiffness in order to react against the downward forces required to keep the nacelle from rising throughout the flight envelope. Second, the downstop assembly must provide enough lateral stiffness to ensure flight stability. The exact amount of lateral stiffness is based upon aircraft geometry, flight envelope requirements, adjacent part stiffness, and several other factors that are unknown until flight testing is underway. Therefore, it is desirable that the downstop assembly be tunable in such a way that redesign of adjacent parts is not required as a result of the need to increase or decrease the lateral stiffness. If the lateral stiffness is matched or tuned to a particular aircraft's minimum lateral stiffness requirement, then the aircraft's wing structure can be isolated from damaging lateral static and oscillatory loads.

Certain attempts have been made to isolate the static and dynamic loads created between the wing structure and the nacelle while the tilt rotor aircraft is in the airplane mode. In some tilt rotor aircraft, the lateral loads have been isolated by a downstop assembly having long vertical blade. In this application, the height of the vertical blade requires a large fairing to be used, thus increasing the frontal drag of the aircraft. Other tilt rotor aircraft have minimized the height of the downstop assembly, but at the cost of introducing lateral loads into the wing structure. Thus, although great strides have been made in the design of tilt rotor aircraft, the problem of isolating lateral nacelle loads from the wing structure by using a package that is small, adjustable, and vertically stiff has not been adequately resolved.

BRIEF SUMMARY OF THE INVENTION

There is a need for a tilt rotor aircraft having a low-height tunable tilt rotor downstop assembly.

It is an object of the present invention to provide a low-height tilt rotor downstop assembly for isolating lateral loads while providing high vertical stiffness.

It is another object of the present invention to provide a tunable tilt rotor downstop assembly for isolating lateral loads.

It is yet another object of the invention to provide a tilt rotor downstop assembly for isolating lateral loads that does not intrude into the wing structure.

It is yet another object of the present invention to provide a low-height tunable tilt rotor downstop assembly for isolating both static and dynamic lateral loads.

It is yet another object of the present invention to provide a low-height tunable tilt rotor assembly downstop having an L-shaped striker arm, the downstop being tunable by adjusting the physical dimensions of the longer leg of the L-shaped striker arm.

It is yet another object of the present invention to provide a tilt rotor aircraft in which lateral nacelle loads are isolated by a low-height tunable tilt rotor downstop assembly.

DETAILED DESCRIPTION OF THE PREFERRED EMBODIMENT

Figure 1A:
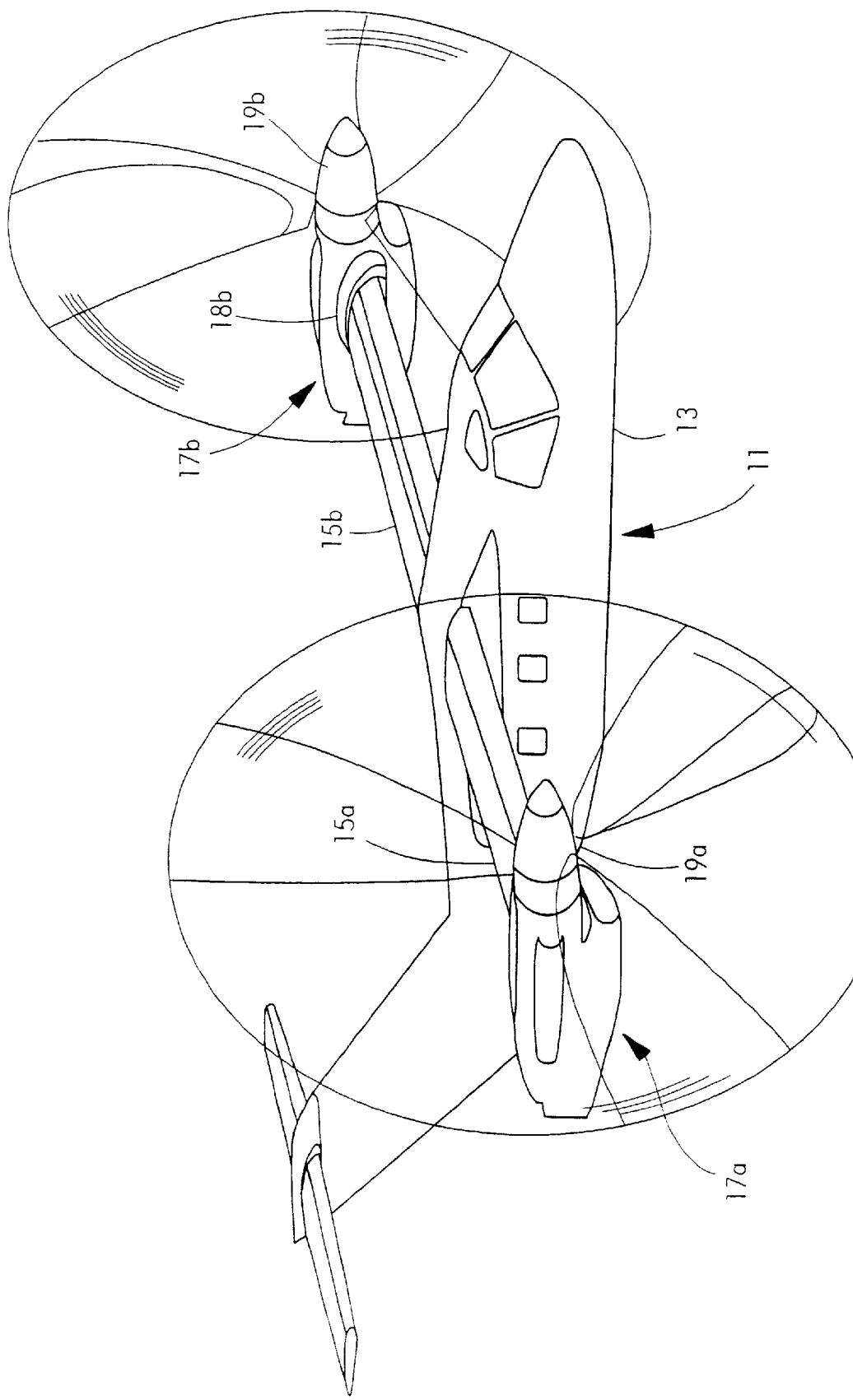
FIG. 1A is a perspective view of a tilt rotor aircraft in an airplane mode.
Figure 1B:
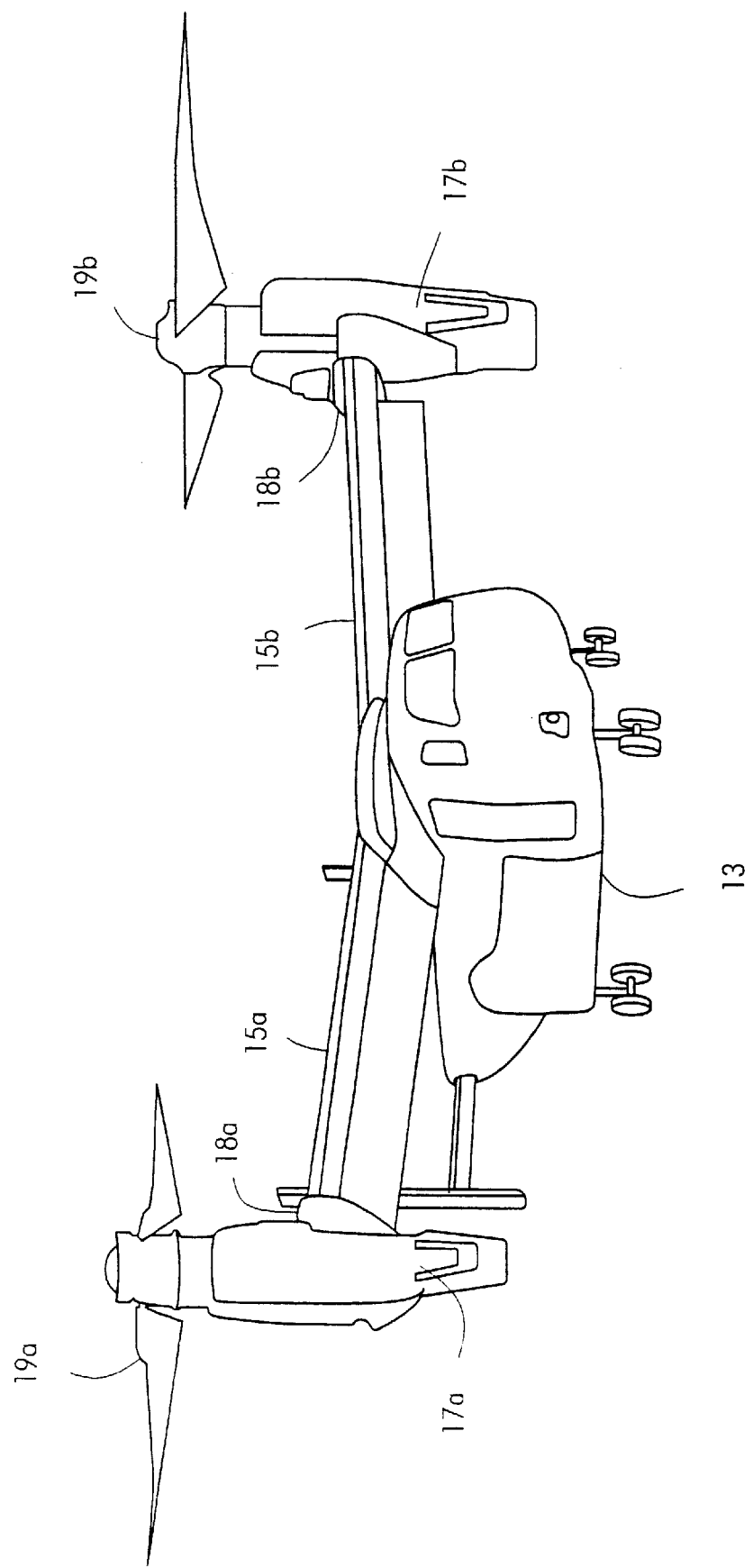
FIG. 1B is a perspective view of a tilt rotor aircraft in a helicopter mode.

Referring to FIGS. 1A and 1B in the drawings, a typical tilt rotor aircraft 11 is illustrated. Tilt rotor aircraft 11 has an airframe 13 and wings 15a and 15b coupled to airframe 13. As is conventional, wings 15a and 15b terminate with tilt rotor assemblies 17a and 17b, respectively. Fairings 18a and 18b for reducing drag are disposed between tilt rotor assemblies 17a and 17b and wings 15a and 15b. Tilt rotor assemblies 17a and 17b each may include an engine, a transmission, and a gear box (see FIG. 5) for driving prop-rotors 19a and 19b. Conversion actuators (see FIG. 8) control the position of tilt rotor assemblies 17a and 17b between an airplane mode, as illustrated in FIG. 1A, and a helicopter mode, as illustrated in FIG. 1B. In the airplane mode, tilt rotor aircraft 11 can be flown and operated like a conventional fixed-wing propeller driven aircraft. In the helicopter mode, tilt rotor aircraft 11 can take-off, hover, land, and be operated like a conventional rotary wing aircraft or helicopter.

Figure 2A:
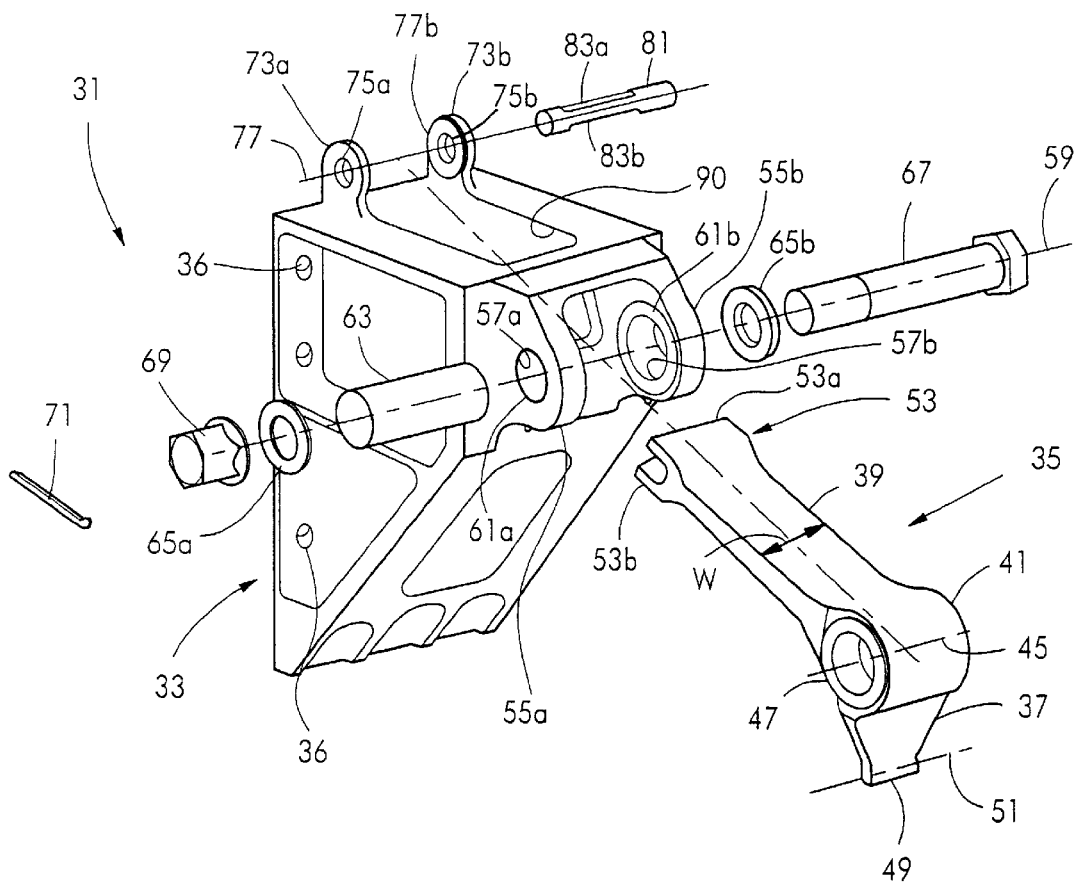
FIG. 2A is an exploded perspective view of a striker assembly of a low-height tunable tilt rotor downstop according to the present invention.
Figure 2B:
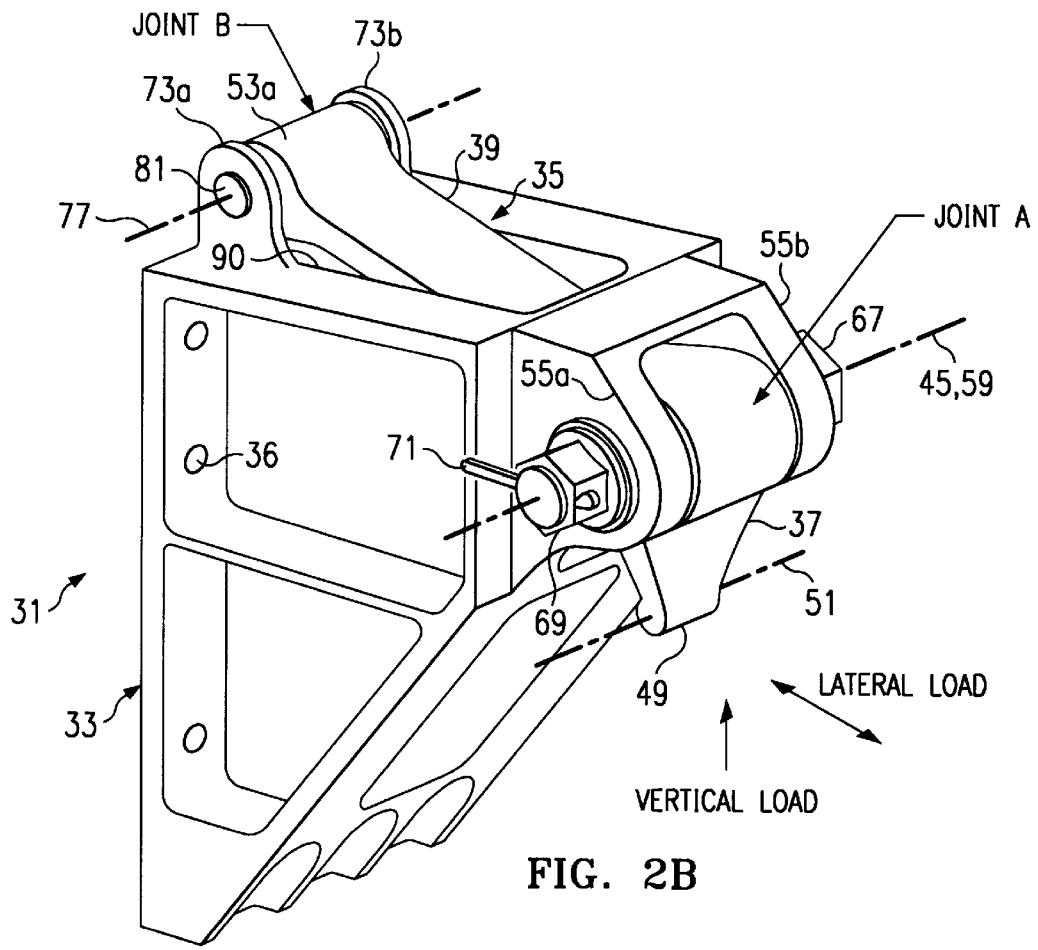
FIG. 2B is an assembled perspective view of the striker assembly of FIG. 2A.
Figure 2C:
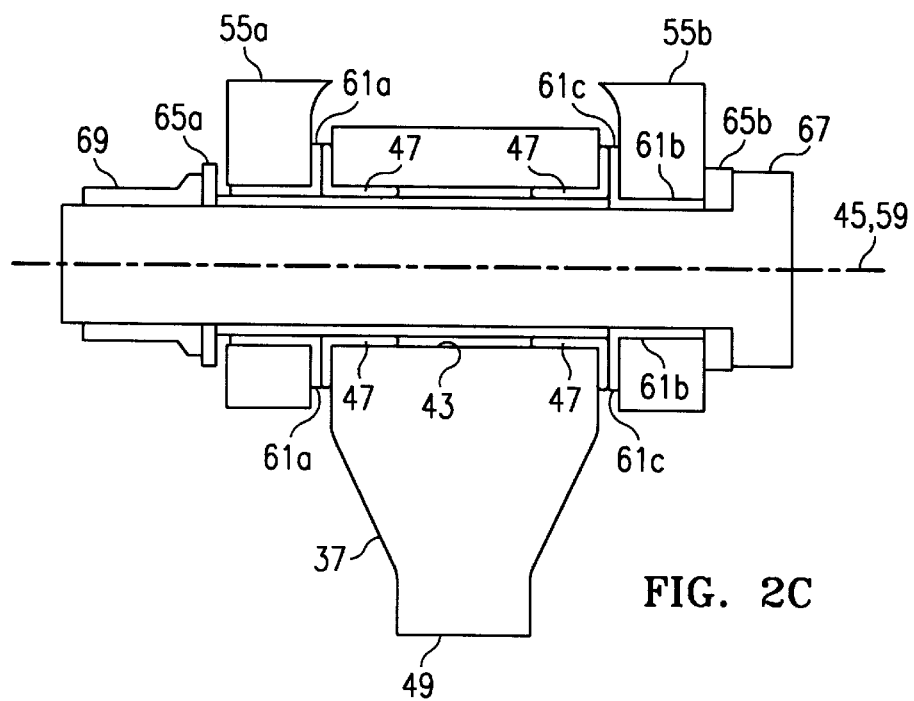
FIG. 2C is a cut-away view of Joint A of the striker assembly of FIG. 2A.

Referring now to FIGS. 2A–2C in the drawings, the preferred embodiment of a low-height tunable tilt rotor downstop according to the present invention is illustrated. A striker assembly 31 includes a base member 33 configured to receive an angled, tunable striker arm 35. Base member 33 is preferably made of aluminum, but may be made of any other sufficiently rigid material. Base member 33 includes a plurality of mounting apertures 36. Striker arm 35 is generally L-shaped having a post portion 37 and an leg portion 39. Striker arm 35 is preferably made of titanium, but may be made of other materials for which the mechanical properties, in particular bending stiffness, may be adjusted, or "tuned," by altering the geometrical dimensions of striker arm 35. This tuning feature of striker arm 35 plays a central role in the present invention, and will be discussed in more detail below.

Post portion 37 and leg portion 39 of striker arm 35 intersect at a generally cylindrical corner portion 41. Corner portion 41 includes a cylindrical bore 43 that passes transversely through corner portion 41 along an axis 45. Bushings 47 are coupled to the interior of bore 43 on each end of bore 43. Bushings 47 are preferably anti-friction bushings, such as bushings having a teflon lining. Bushings 47 have an interference fit with bore 43, but may be coupled to bore 43 by other well known means. Leg portion 39 has a transverse width w that is generally constant over the length of leg portion 39. Post portion 37 preferably tapers inwardly from corner portion 41 to a tip portion 49. Tip portion 49 is generally cylindrical along an axis 51. Leg portion 39 extends away from corner portion 41 and terminates at a forked end 53 having an upper flat 53a and a generally parallel lower flat 53b. Striker arm 35 will be explained in more detail below with respect to FIG. 3.

Base member 33 includes a plurality of lugs 55a and 55b. Lugs 55a and 55b are generally parallel. Lugs 55a and 55b include bores 57a and 57b, respectively, passing therethrough. Bushings 61a and 61b are coupled to the interior of bores 57a and 57b, respectively, along an axis 59. Bushings 61a and 61b are similar in construction to bushings 47. Bushings 61a and 61b are preferably anti-friction bushings, such as bushings having a teflon lining. Bushings 61a and 61b are preferably interference fit into bores 57a and 57b, but may be coupled to lugs 55a and 55b by other well known means.

A slip bushing 63 is received by bushing 61a. Slip bushing 63 is held in place between a bushing flange 61c of bushing 61b and a washer 65a. A bolt 67 passes along axis 59 through washer 65b, bushing 61b, bushing 63, and washer 65a; and is releasably received by a nut 69 having a pin 71. In this manner, an anti-friction pivot joint A (see FIG. 2C) is created, about which post portion 37 and leg portion 39 pivot.

Continuing with reference to FIGS. 2A–2C in the drawings, base member 33 includes a second plurality of lugs 73a and 73b. Lugs 73a and 73b are generally parallel to each other and parallel to axis 59. Lugs 73a and 73b include bores 75a and 75b, respectively, passing therethrough. Bushings 79a and 79b are coupled to the interior of bores 75a and 75b, respectively, along an axis 77. Bushings 79a and 79b are similar in construction to bushings 47. Bushings 79a and 79b are preferably anti-friction bushings, such as bushings having a teflon lining. Bushings 79a and 79b are preferably interference fit into bores 75a and 75b, but may be coupled to lugs 73a and 73b by other well known means.

A retainer pin 81 is received through bushings 79a and 79b. Retainer pin 81 has a pair of recessed flats 83a and 83b. Flats 83a and 83b are generally parallel to each other and parallel to axis 59. It is preferred that at least recessed portions 83a and 83b of retainer pin 81 are coated with an anti-friction material, such as KARON, which is commercially available from the Kamatics Corporation of Bloomfield, Conn. Retainer pin 81 is free to rotate within tabs 73a and 73b about axis 77. Flat recessed portions 83a and 83b are configured to slidingly receive fork 53, thereby forming a sliding and pivoting joint B (see FIG. 2B). Because fork 53 is allowed to slide relative to retainer pin 81, and rotate relative to axis 77, leg portion 39 will flex by bending as a lateral load is applied to post portion 37. However, leg portion 39 has sufficient stiffness to prevent flats 53a and 53b from translating enough relative to tabs 73a and 73b such that fork 53 releases from retainer pin 81. In other words, the sliding connection of fork 53 with retainer pin 81 allows post portion 37 to pivot about axis 59, i.e., joint A.

As shown in FIG. 2B, striker arm 35 passes from joint A to joint B along a slot 90 in base member 33. Slot 90 allows leg portion 39 of striker arm 35 to remain in a generally horizontal position and flex or bend in a vertical plane without restriction. Slot 90 is configured to accommodate variations in the vertical thickness of leg portion 39, as will be explained in more detail below. In addition, slot 90 allows striker assembly 31 to maintain an overall low vertical height or profile. Although the terms "vertical" and "horizontal" are used herein, it should be understood that these terms are used only for ease of explanation and are not intended to be limiting as to the directions in which the present invention functions.

With striker assembly 31 configured and assembled in this manner, the lateral loads indicated by the arrows in FIG. 2B generated by tilt rotor assemblies 17a and 17b while in the airplane mode, are transferred from tip portion 49 of post portion 37 to leg portion 39 and fork 53. Because post portion 37 is short, providing the low-height feature of the present invention, post portion 37 does not bend significantly. The lateral loads are transferred to leg portion 39 by post portion 37 rotating about axis 59. As leg portion 39 bends, the lateral loads generated by tilt rotor assemblies 17a and 17b are isolated and absorbed, thereby preventing the lateral loads from being transferred to wings 15a and 15b. Therefore, wings 15a and 15b do not require additional structural support to react against the oscillatory vibration loads. This provides tremendous savings in terms of weight and cost.

Figure 3:
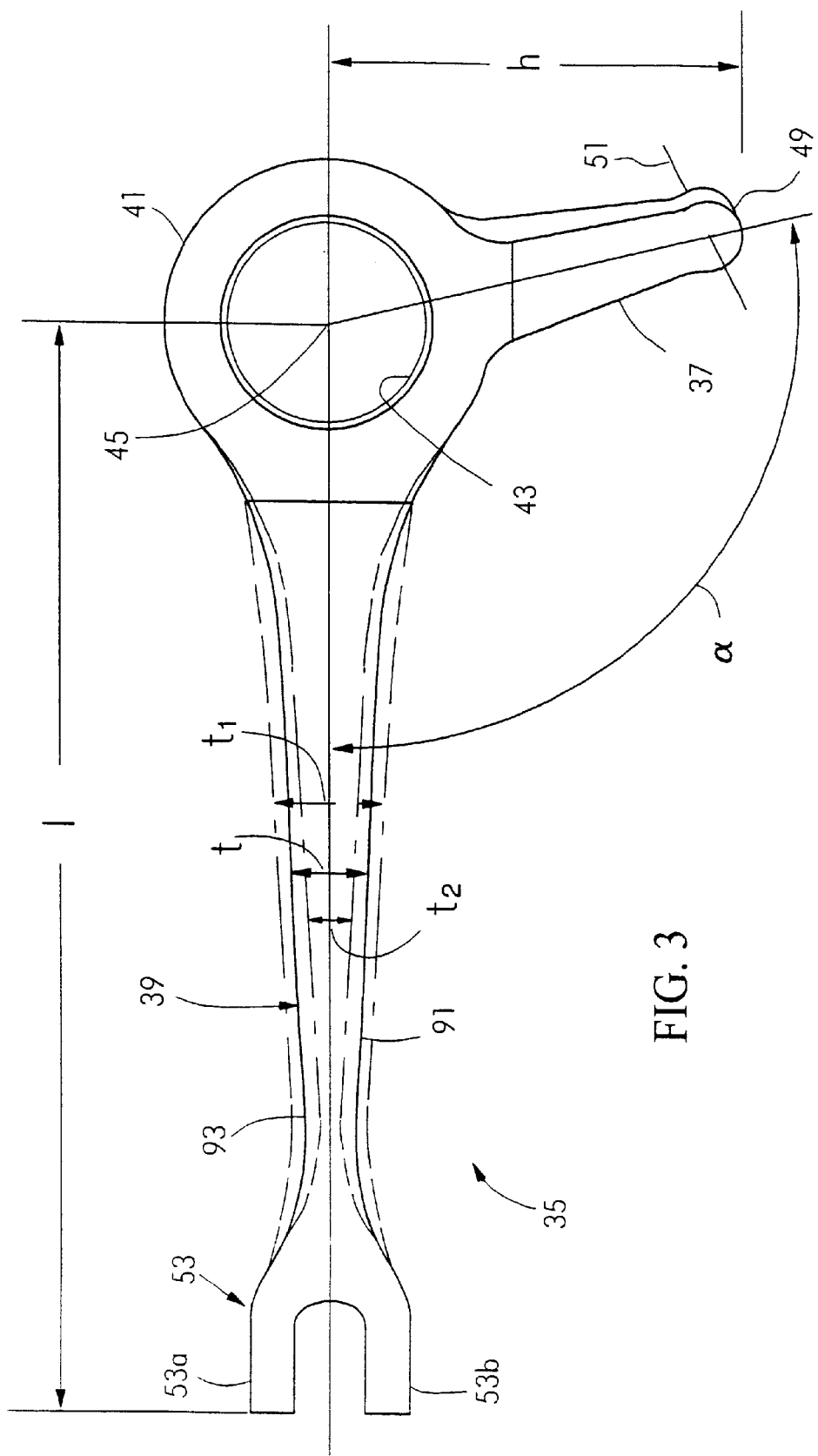
FIG. 3 is a front view of the striker arm of the striker assembly of FIGS. 2A and 2B.

Referring now to FIG. 3 in the drawings, striker arm 35 is illustrated in a front view. As is shown, post member 37 and leg member 39 form an angle α about axis 45. Angle α is not restricted; however, angles greater than 115° may adversely effect the low-height feature of the present invention. Post portion 37 has a vertical height h, as measured from the lowest point of tip portion 49 to axis 45; and leg portion 39 has a length l, as measured from the end of fork 53 to axis 45. Due to the low-height feature of the present invention, height h is smaller than length l. It should be noted that axis 45, about which corner portion 41 is concentric, and axis 51, about which tip portion 49 is concentric, do not have to be parallel. In general it is preferred that axis 51 be made parallel to the mast centerline of tilt rotor assemblies 17a and 17b. It should be understood that for certain tilt rotor aircraft, axis 45 and axis 51 may be parallel without significantly affecting the functionality of striker arm 35.

Leg portion 39 has a selected vertical height, or thickness t, as measured from a lower surface 91 to an upper surface 93. Based upon thickness t, the leg portion 39 has a selected vertical cross-section, or thickness profile. It is preferred that striker arm 35 be made of a rigid material, for which the bending stiffness of leg portion 39 may be selectively varied according to thickness t, and the corresponding thickness profile. It is preferred that width w and length l of leg portion 39 remain constant so as not to require changes to retainer pin 81 or slot 90 (see FIG. 2B). For example, if striker arm 35 is made of titanium, has length l of about 7.0 inches, height h of about 2.5 inches, and thickness t varying from about 0.66 inches near corner portion 41 to about 0.38 inches near fork 53, then leg portion 39 of has a bending stiffness range of about 50,000 pounds per inch to about 150,000 pounds per inch.

Because it is preferred that width w and length l of leg portion 39 be constant, the bending stiffness of leg portion 39 may be selectively determined by altering thickness t of leg portion 39. In other words, striker arm 35 may be tuned to a selective bending stiffness by altering the thickness profile of leg portion 39. It will be apparent that the bending stiffness of leg portion 39 will increase as thickness t increases. Thus, for similar materials, the bending stiffness of leg portion 39 is greater for a thickness profile having a variable thickness $t_1$, than for a thickness profile having a variable thickness t; and the bending stiffness of leg portion 39 is less for a thickness profile having a variable thickness $t_2$, than for a thickness profile having a variable thickness t. It is preferred that tip portion 49 of post portion 37 be coated with a very hard material, such as tungsten carbide, to resist fretting against the surface of a V-block 115 (see FIG. 5). The interface between tip portion 49 and V-block 115 will be explained in more detail below.

Figure 4:
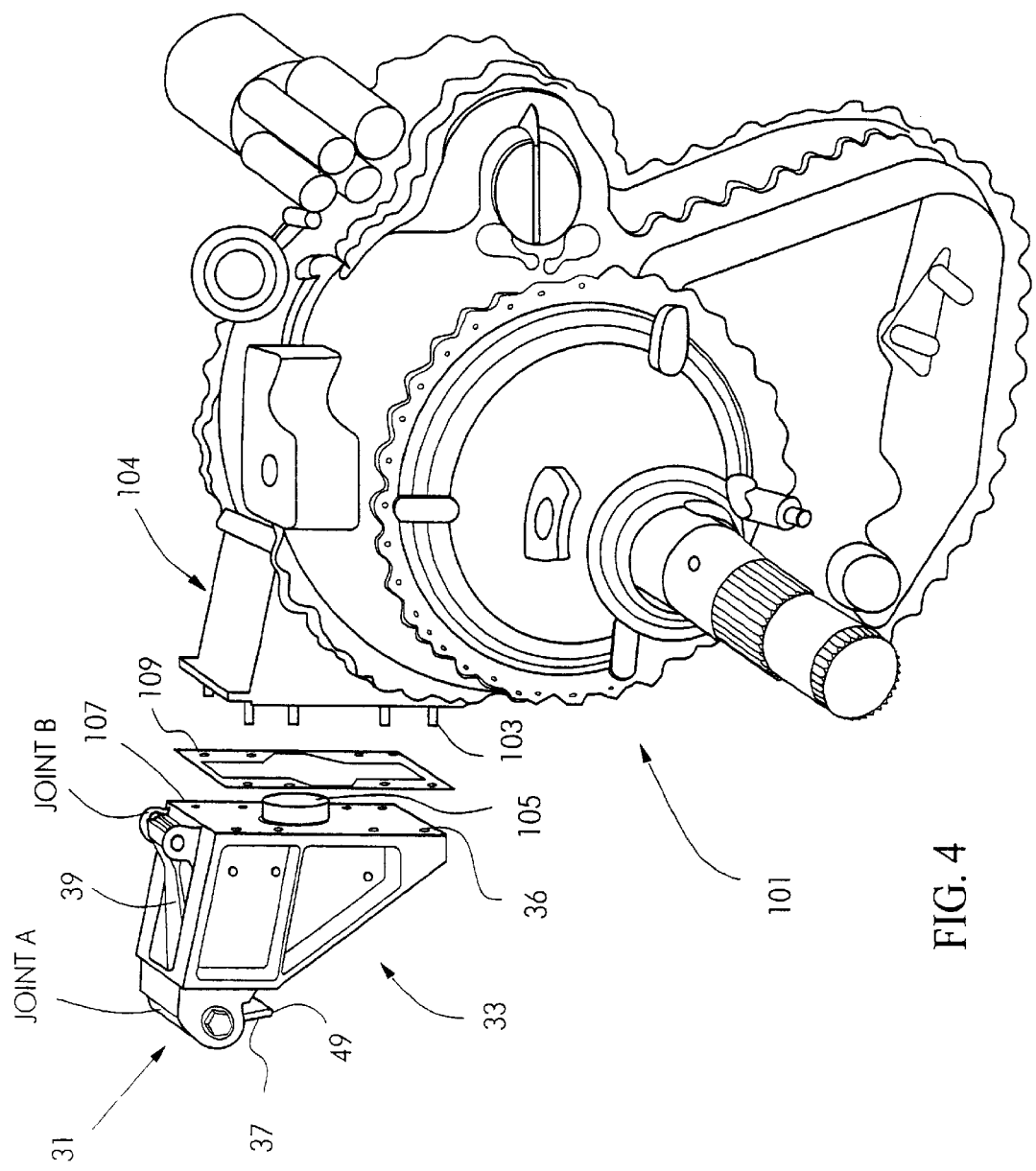
FIG. 4 is an exploded perspective view illustrating the attachment of the striker assembly of FIGS. 2A and 2B to a prop-rotor gear box assembly.

Referring now to FIG. 4 in the drawings, assembled striker assembly 31 of FIG. 2B is shown being coupled to a prop-rotor gear box assembly 101. A prop-rotor gear box assembly 101 is disposed within each tilt rotor assembly 17a and 17b (see FIGS. 1A and 1B). Prop-rotor gear box assemblies 101 drive rotor hubs 19a and 19b. Each prop-rotor gear box assembly 101 is adapted to be coupled to striker assembly 31, preferably by the inclusion of studs 103 disposed on a coupling portion 104. Studs 103 are aligned with and releasably received by mounting means 36 of base member 33. A shear boss 105 is coupled to base member 33 to provide additional support against shear forces acting between striker assembly 31 and prop-rotor gear assembly 101. A scrim 107, preferably an epoxy scrim, is bonded to base member 33 to provide fretting protection. A solid shim 109, preferably made of a metallic material, is disposed between scrim 107 of base member 33 and coupling portion 104 of prop-rotor gear assembly 101 to provide adjustment capability. Although striker assembly 31 has been shown and described as being coupled to prop-rotor gear box assembly 101, it should be understood that striker assembly 31 may be coupled to other components of tilt rotor assembly 17a or 17b.

Figure 5:
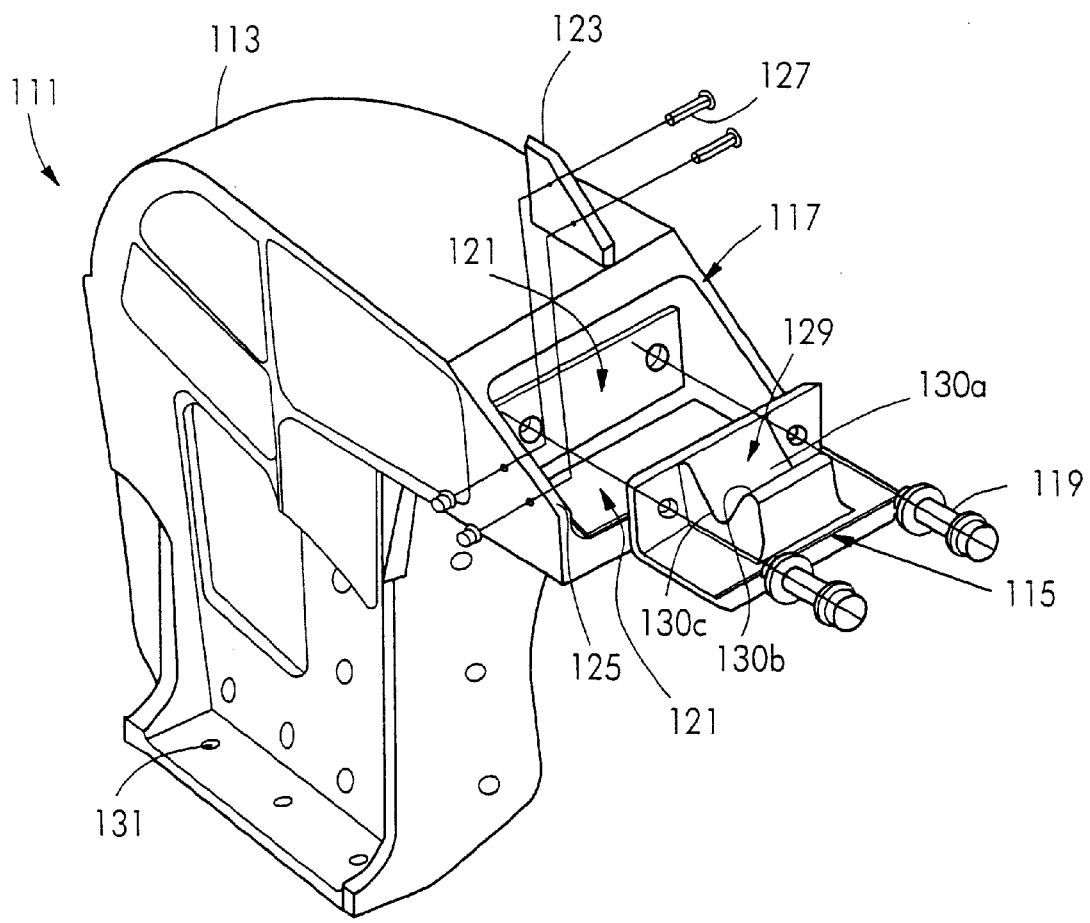
FIG. 5 is an exploded perspective view of a cradle assembly of the low-height tunable tilt rotor downstop according to the present invention.

Referring now to FIG. 5 in the drawings, an exploded perspective view of a cradle assembly 111 of the low-height tunable downstop according to the present invention is illustrated. Cradle assembly 111 includes an attachment portion 113 and yaw restraint portion, or V-block 115. Attachment portion 113 is preferably made of a rigid metallic material, such as aluminum. V-block 115 is carried in a trough portion 117 of attachment portion 113. V-block 115 is adjustably coupled to attachment portion 113 by fasteners, preferably bolts 119. Trough portion 117 is preferably lined with shims 121a and 121b. Shims 121a and 121b are preferably aluminum peel shims which allow vertical and lateral adjustment, respectively, of V-block 115. A spacer plate 123 is disposed on a forward internal face 125 of trough portion 117. Spacer plate 123 is necessary on forward internal face 125 because tilt rotor assemblies 17a and 17b exert rotor thrust forces upon V-block 115 in the forward direction. Spacer plate 123 preferably includes an epoxy coating to prevent fretting. Spacer plate 123 is coupled to trough portion 117 by conventional fastening means 127, such as bolts or rivets.

V-block 115 is made of a rigid metallic material, such as titanium. V-block 115 has a rounded V-shaped groove interface portion 129 configured to releasably receive tip portion 49 of post portion 37 as tip portion 49 rotates downward with each tilt rotor assembly 17a and 17b during conversion into airplane mode. Striker interface portion 129 includes inclined surfaces 130a and 130b that converge to form a generally longitudinal trough 130c. Trough 130c is generally transverse to the lateral loads, or yaw loads, shown in FIG. 2B. Because striker interface portion 129 is subjected to oscillatory loads from tip portion 49, it is desirable that striker interface portion 129 have a very hard surface to resist fretting. Thus, it is preferable that V-block 115 be made of a hard metallic material, and that at least striker interface portion 129 be coated with a very hard material, such as tungsten carbide. To ensure that V-block 115 does not fret relative to attachment portion, it is preferred that V-block 115 be coated with an adhesive material, such as epoxy, on all surfaces that are in contact with shims 121a and 121b. Attachment portion 113 includes mounting apertures 131.

Figure 6:
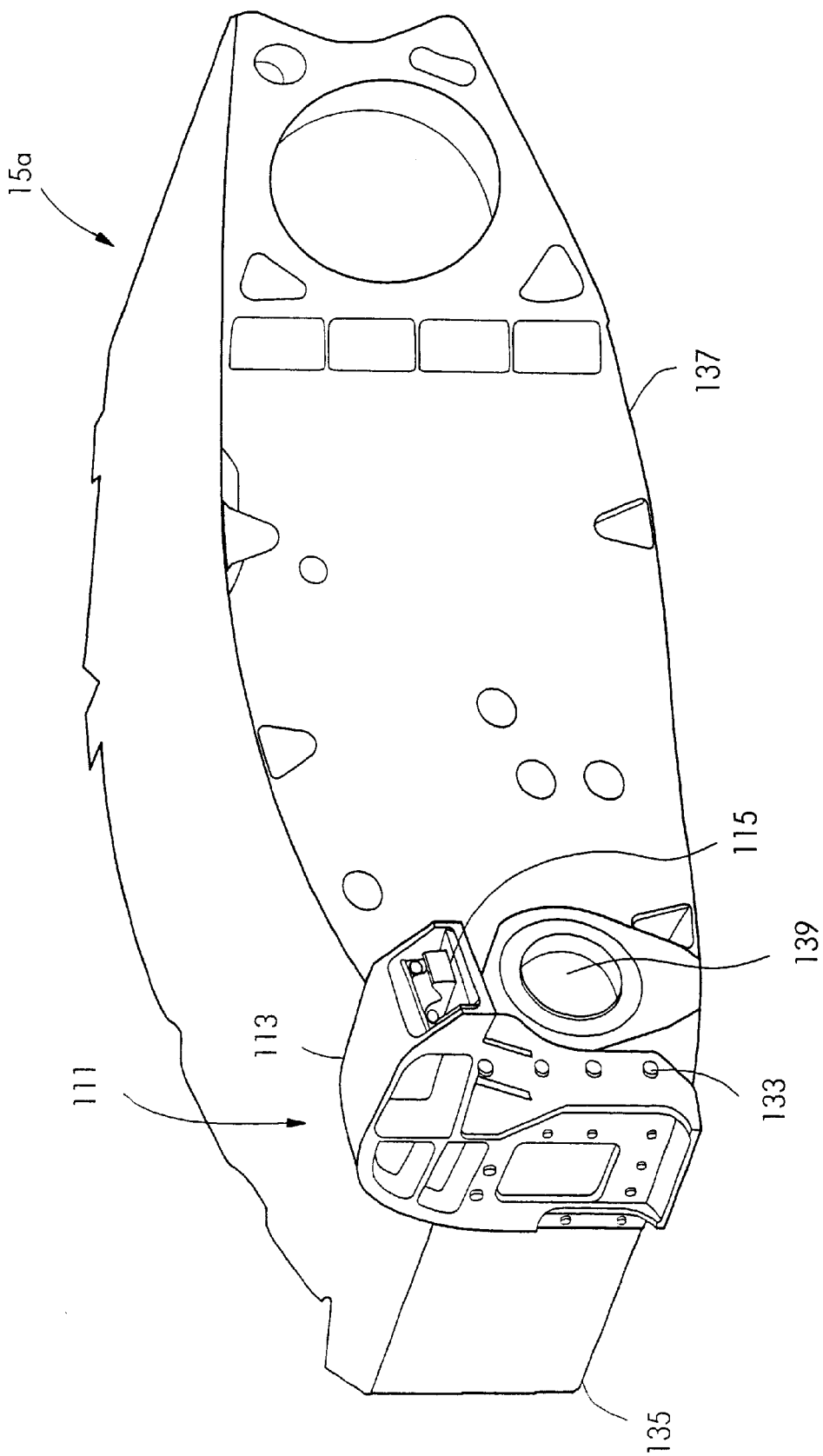
FIG. 6 is a perspective view illustrating the attachment of the cradle assembly of FIG. 5 to an outboard wing rib and a forward wing spar.

Referring now to FIG. 6 in the drawings, cradle assembly 111 is illustrated coupled to wing 15a. Attachment portion 113 of cradle assembly 111 is adapted to be coupled to at least one wing spar and at least one wing rib. Cradle assembly 111 does not intrude into the interior of wing 15a. Preferably, attachment portion 113 is coupled to a forward wing spar 135 and an outboard wing rib 137 by conventional fastening means 133, such as bolts or rivets, through mounting apertures 131. As is shown, trough portion 117 may extend outboard in a cantilevered fashion beyond outboard wing rib 137 to ensure that the low-height feature of the present invention is maintained. Attachment portion 113 is configured to allow attachment of cradle assembly 111 to wing 15a, while not interfering with other components of wing 15a, such as aperture 139 through which a conversion actuator spindle 143 (see FIG. 7) passes. Although cradle assembly 111 has been shown and described as being coupled to forward wing spar 135, it should be understood that cradle assembly 111 may be coupled to other components of wing 15a or 15b.

Figure 7:
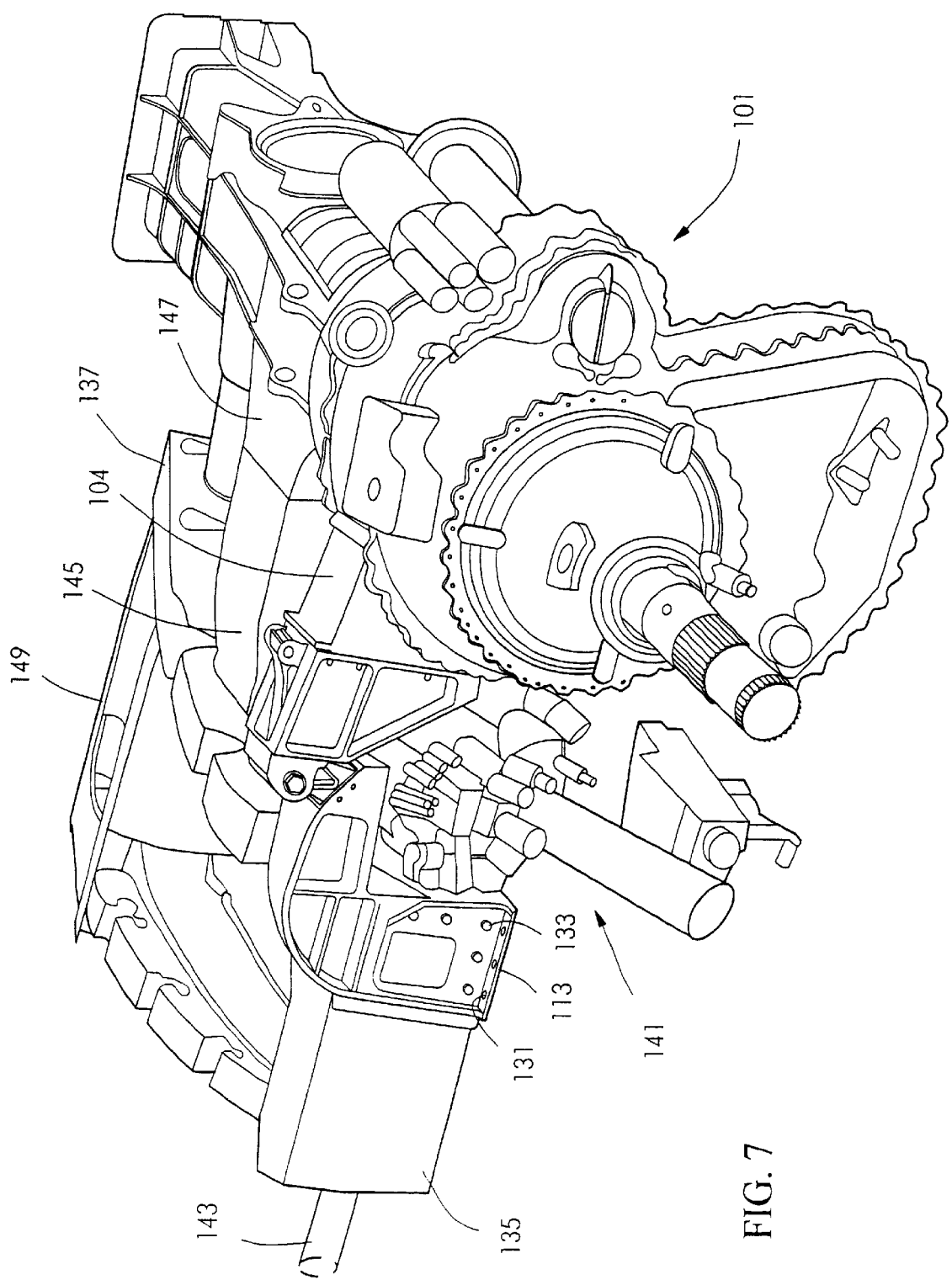
FIG. 7 is a perspective view of the assembled low-height tunable tilt rotor downstop according to the present invention, including the striker assembly of FIGS. 2A and 2B and the cradle assembly of FIGS. 5 and 6.

Referring now to FIG. 7 in the drawings, the components of FIGS. 2A–6 are illustrated in an assembled fashion. Conventional hydraulic conversion actuators 141 are used to convert tilt rotor assemblies 17a and 17b between the airplane mode and the helicopter mode. Conversion actuators 141 pivot about spindles 143 as conversion actuators 141 actuate tilt rotor assemblies 17a and 17b by exerting forces on pylons 145. Tilt rotor assemblies 17a and 17b pivot about spindles 147 that pass through rear portions 149 of wings 15a and 15b. It should be apparent that cradle assembly 111 may be coupled to coupling portion 104 of prop-rotor gear assembly 101, and striker assembly 31 may be coupled to wings 15a and 15b without affecting the functionality, tunability, or low-height feature of the present invention.

In operation, tilt rotor assemblies 17a and 17b are rotated downward from the helicopter mode (see FIG. 1B) to the airplane mode (see FIG. 1A). It is preferred that tip portion 49 be forced against V-block 115 at a selected preload while tilt rotor aircraft 11 is in the airplane mode (see FIG. 1A). Because striker assembly 31 is coupled to prop-rotor gear assembly 101 via coupling portion 104, as tilt rotor assemblies 17a and 17b reach the airplane mode, tip portions 49 of post portion 37 of striker arm 35 are forced into contact with V-blocks 115. In this manner, the selected preload is transferred from cradle assembly 111 to wing 15a. As long as the selected vertical preload is maintained, tilt rotor aircraft 11 will remain stable in the aircraft mode. If the selected preload is not maintained, tilt rotor aircraft will become unstable due to the oscillatory loads. The present invention provides a means of reacting the vertical preload between wings 15a, 15b and tilt rotor assemblies 17a, 17b; and a means of isolating and absorbing both static and dynamic lateral flight loads between wings 15a, 15b and tilt rotor assemblies 17a, 17b. It is desirable that tilt rotor assemblies 17a and 17b receive a selected downward preload from conversion actuator 141 (see FIG. 7) such that tip portions 49 remain in contact with V-block 115 throughout the flight envelope of the aircraft. As long as the selected preload is maintained, tip portion 49 will not move relative to V-block 115, and the yaw loads, or lateral loads, will be effectively restrained. In the preferred embodiment of the present invention, V-block 115 does not latch onto or lock onto tip portion 49. It should be understood that latching or locking mechanisms may be desirable in certain situations or installations. As is shown, cradle assembly 111 wraps around forward wing spar 135 and outboard wing rib 137. This allows cradle assembly 111 to maintain a low-height.

It should be apparent from the foregoing that an invention having significant advantages has been provided. Providing an L-shaped striker assembly with a short generally vertical post portion and a longer generally horizontal leg portion that can be selectively tuned by merely altering the thickness, allows the present invention to absorb or dampen oscillatory vibration loads without intrusion into the wings, while maintaining a low-height. While the invention is shown in a limited number of forms, it is not limited to just these forms, but is susceptible to various changes and modifications without departing from the spirit thereof.

We claim:

1. An improved tilt rotor aircraft comprising:
    an airframe;
    at least one wing member coupled to the airframe;
    at least one tilt rotor assembly carried by the at least one wing member; and
    a downstop assembly for isolating loads generated by the tilt rotor assembly, the downstop assembly comprising:
        a pivotable striker assembly; and
        a cradle assembly adapted to releasably receive the pivotable striker assembly.

2. The improved tilt rotor aircraft according to claim 1, wherein the downstop assembly may be tuned by selectively altering a bending stiffness of the pivotable striker assembly.

3. The improved tilt rotor aircraft according to claim 1, wherein the pivotable striker assembly is carried by the at least one tilt rotor assembly, and the cradle assembly is carried by the at least one wing member.

4. The improved tilt rotor aircraft according to claim 1, wherein the loads are static and dynamic loads.

5. The improved tilt rotor aircraft according to claim 1, wherein the pivotable striker assembly is carried by the at least one wing member, and the cradle assembly is carried by the at least one tilt rotor assembly.

6. An improved tilt rotor aircraft comprising:
    an airframe;
    at least one wing member coupled to the airframe;
    at least one tilt rotor assembly carried by the at least one wing member; and
    a downstop assembly for isolating loads, the downstop assembly comprising:
        a pivotable striker assembly; and
        a cradle assembly adapted to releasably receive the pivotable striker assembly;
    wherein the pivotable striker assembly comprises:
        a base member adapted to be coupled to the at least one tilt rotor assembly; and
        an angled striker arm having a leg portion and a post portion, the leg portion being longer than the post portion, the angled striker arm being pivotally coupled to the base member; and
    wherein the cradle assembly comprises:
        an attachment portion adapted to be coupled to the at least one wing member; and
        a generally V-shaped member coupled to the attachment portion for releasably receiving the post portion.

7. The improved tilt rotor aircraft according to claim 6, wherein the lateral loads are isolated by the leg portion.

8. The improved tilt rotor aircraft according to claim 7, wherein the leg portion terminates with a forked end that is slidingly coupled to the base member.

9. The improved tilt rotor aircraft according to claim 6, wherein the downstop assembly may be tuned by selectively altering the bending stiffness of the leg portion.

10. The improved tilt rotor aircraft according to claim 9, wherein the bending stiffness is selectively altered by a change in a thickness of the leg portion in the bending plane.

11. The improved tilt rotor aircraft according to claim 6, wherein the post portion is less than about 2.5 inches in height, thereby making the downstop assembly a low-height downstop assembly.

12. An improved tilt rotor aircraft comprising:
    an airframe;
    at least one wing member coupled to the airframe;
    at least one tilt rotor assembly carried by the at least one wing member; and
    a downstop assembly for isolating loads, the downstop assembly comprising:
        a pivotable striker assembly; and
        a cradle assembly adapted to releasably receive the pivotable striker assembly;
    wherein the pivotable striker assembly comprises:
        a base member adapted to be coupled to the at least one wing member; and
        an angled striker arm having a leg portion and a post portion, the leg portion being longer than the post portion, the angled striker arm being pivotally coupled to the base member; and
    wherein the cradle assembly comprises:
        an attachment portion adapted to be coupled to the at least one tilt rotor assembly; and
        a generally V-shaped member coupled to the attachment portion for releasably receiving the post portion.

13. A low-height tunable downstop for use on a tilt rotor aircraft having at least one wing member and at least one tilt rotor assembly pivotally coupled to the at least one wing member, the low-height tunable downstop comprising:

a pivotable striker assembly; and a cradle assembly adapted to releasably receive the pivotable striker assembly;

whereby loads generated by the at least one tilt rotor assembly are isolated.

14. The low-height tunable downstop assembly according to claim 13, wherein the low-height tunable downstop assembly is tuned by selectively altering a bending stiffness of the pivotable striker assembly.

15. The low-height tunable downstop assembly according to claim 13, wherein the pivotable striker assembly is carried by the at least one tilt rotor assembly, and the cradle assembly is carried by the at least one wing member.

16. The low-height tunable downstop assembly according to claim 13, wherein the pivotable striker assembly is carried by the at least one wing member, and the cradle assembly is carried by the at least one tilt rotor assembly.

17. The low-height tunable downstop assembly according to claim 13, wherein the loads are static and dynamic loads.

18. A low-height tunable downstop for use on a tilt rotor aircraft having at least one wing member and at least one tilt rotor assembly pivotally coupled to the at least one wing member, the low-height tunable downstop comprising:

a pivotable striker assembly; and a cradle assembly adapted to releasably receive the pivotable striker assembly wherein the pivotable striker assembly comprises:

a base member adapted to be coupled to the at least one wing member; and an angled striker arm having a leg portion and a post portion, the leg portion being longer than the post portion, the angled striker arm being pivotally coupled to the base member; and wherein the cradle assembly comprises:

an attachment portion adapted to the coupled to the at least one tilt rotor assembly; and a generally V-shaped member coupled to the attachment portion for releasably receiving the post portion.

19. The low-height tunable downstop assembly according to claim 18, wherein the low-height tunable downstop assembly may be tuned by selectively altering a bending stiffness of the leg portion.

20. The low-height tunable downstop assembly according to claim 19, wherein the bending stiffness is selectively altered by a change in a thickness of the leg portion in the bending plane.

21. A low-height tunable downstop for use on a tilt rotor aircraft having at least one wing member and at least one tilt rotor assembly pivotally coupled to the at least one wing member, the low-height tunable downstop comprising:

a pivotable striker assembly; and a cradle assembly adapted to releasably receive the pivotable striker assembly wherein the pivotable striker assembly comprises:

a base member adapted to be coupled to the at least one tilt rotor assembly; and an angled striker arm having a leg portion and a post portion, the leg portion being longer than the post portion, the angled striker arm being pivotally coupled to the base member; and wherein the cradle assembly comprises:

an attachment portion adapted to be coupled to the at least one wing member; and a generally V-shaped member coupled to the attachment portion for reasonably receiving the post portion.

22. The low-height tunable downstop assembly according to claim 21, wherein the lateral loads are isolated by the leg portion, such that the lateral loads are not transferred to the at least one wing member.

23. The low-height tunable downstop assembly according to claim 22, wherein the leg portion terminates with a forked end that is slidingly coupled to the base member.

24. The low-height tunable downstop assembly according to claim 21, wherein the post portion is less than about 2.5 inches in height, thereby making the downstop assembly a low-height downstop assembly.

25. The low-height tunable downstop assembly according to claim 21, wherein the leg portion is at least about 7.0 inches in length.

26. The low-height tunable downstop assembly according to claim 21, wherein the striker arm is made of titanium and the leg portion is configured such that the leg portion has a bending stiffness of at least about 50,000 pounds per inch.

27. The low-height tunable downstop assembly according to claim 21, wherein the striker arm is made of titanium and the leg portion is configured such that the leg portion has a bending stiffness in the range of about 50,000 pounds per inch to about 150,000 pounds per inch.

28. The low-height tunable downstop assembly according to claim 21, wherein the striker arm is made of titanium and the leg portion is configured such that the leg portion has a bending stiffness of up to about 150,000 pounds per inch.

29. A method of isolating vibration in a tilt rotor aircraft having an airframe, at least one wing member coupled to the airframe, and at least one tilt rotor assembly coupled to the at least one wing member, the method comprising the steps of:

providing a pivotable striker assembly;

coupling the pivotable striker assembly to the at least one tilt rotor assembly;

providing a cradle assembly for releasably receiving the pivotable striker assembly;

coupling the cradle assembly to the at least one wing member;

releasably contacting the pivotable striker assembly with the cradle assembly;

isolating the vibration with the pivotable striker assembly.

30. The method of isolating vibration in a tilt rotor aircraft according to claim 29, wherein the step of providing a pivotable striker assembly further comprises the steps of:

providing a base member adapted for coupling to the at least one tilt rotor assembly;

providing an angled striker arm having a leg portion and a post portion, the leg portion being longer than the post portion; and pivotally coupling the angled striker arm to the base member;

wherein the step of providing a cradle member for releasably receiving the pivotable striker assembly further comprises the steps of:

providing an attachment portion adapted for coupling to the at least one wing member; and providing a generally V-shaped member;

coupling the generally V-shaped member to the attachment portion; and wherein the step of releasably contacting the pivotable striker assembly with the cradle assembly is achieved by releasably contacting the post portion with V-shaped member.

31. A method of isolating vibration in a tilt rotor aircraft having an airframe, at least one wing member coupled to the airframe, and at least one tilt rotor assembly coupled to the at least one wing member, the method comprising the steps of:

provic a pivotable striker assembly;

coupling the pivotable striker assembly to the at least one wing member;

providing a cradle assembly for releasably receiving the pivotable striker assembly;

coupling the cradle assembly to the at least one tilt rotor assembly;

releasably contacting the pivotable striker assembly with the cradle assembly;

isolating the vibration with the pivotable striker assembly.

32. The method of isolating vibration in a tilt rotor aircraft according to claim 31, wherein the step of providing a pivotable striker assembly further comprises the steps of:

providing a base member adapted for coupling to the at least one wing member;

providing an angled striker arm having a leg portion and a post portion, the leg portion being longer than the post portion; and pivotally coupling the angled striker arm to the base member;

wherein the step of providing a cradle member for releasably receiving the pivotable striker assembly further comprises the steps of:

providing an attachment portion adapted for coupling to the at least one tilt rotor assembly; and providing a generally V-shaped member;

coupling the generally V-shaped member to the attachment portion; and wherein the step of releasably contacting the pivotable striker assembly with the cradle assembly is achieved by releasably contacting the post portion with V-shaped member.

\* \* \* \* \*